US007165093B2

(12) United States Patent
Smith et al.

(10) Patent No.: US 7,165,093 B2
(45) Date of Patent: Jan. 16, 2007

(54) ACTIVE ELECTRONIC MESSAGING SYSTEM

(75) Inventors: Ian E. Smith, San Francisco, CA (US); Mark A. Howard, San Francisco, CA (US); Trevor F. Smith, San Francisco, CA (US); Victoria M. E. Bellotti, San Francisco, CA (US); Karen Marcelo, San Francisco, CA (US)

(73) Assignee: Xerox Corporation, Stamford, CT (US)

( * ) Notice: Subject to any disclaimer, the term of this patent is extended or adjusted under 35 U.S.C. 154(b) by 889 days.

(21) Appl. No.: 09/888,298

(22) Filed: Jun. 22, 2001

(65) Prior Publication Data

US 2002/0198999 A1   Dec. 26, 2002

(51) Int. Cl.
G06F 15/16  (2006.01)
(52) U.S. Cl. ............... 709/206; 709/203; 709/207
(58) Field of Classification Search ........... 709/227, 709/203, 206, 207, 218, 219
See application file for complete search history.

(56) References Cited

U.S. PATENT DOCUMENTS

| 5,906,656 | A | | 5/1999 | Williams | |
|---|---|---|---|---|---|
| 6,029,258 | A | * | 2/2000 | Ahmad | 714/46 |
| 6,327,610 | B1 | * | 12/2001 | Uchida et al. | 709/206 |
| 6,449,635 | B1 | * | 9/2002 | Tilden et al. | 709/206 |
| 6,460,075 | B1 | * | 10/2002 | Krueger et al. | 709/206 |
| 6,704,024 | B1 | * | 3/2004 | Robotham et al. | 345/581 |
| 6,728,711 | B1 | * | 4/2004 | Richard | 707/9 |
| 6,795,863 | B1 | * | 9/2004 | Doty, Jr. | 709/231 |
| 6,895,427 | B1 | * | 5/2005 | Quine et al. | 709/206 |

FOREIGN PATENT DOCUMENTS

| WO | WO-92-22033 | * | 12/1992 |
|---|---|---|---|
| WO | WO9222033 A | | 12/1992 |

OTHER PUBLICATIONS

Vittal, John: "Active Message Processing: Message as Messengers" Computer Message Systems. Proceedings of the IFIP TC International Symposium, The Netherlands, Apr. 6, 1981, pp. 175-195.
Rose, Marshall and Borenstein, Nathaniel: "A Model for Enabled Mail (EM)" Jul. 19, 1994, published online at http://www.island-resort.com/enabled.htm.
Borenstein, Nathaniel: "E-mail with a Mind of its Own: The Safe-TCL Language for Enabled Mail" IFIP Transactions C. Communications Systems, Elsevier Science B.V., Amsterdam, The Netherlands. No. C-25. 1994. pp. 389-402.

(Continued)

Primary Examiner—Ario Etienne
Assistant Examiner—Sargon N. Nano
(74) Attorney, Agent, or Firm—Fliesler Meyer LLP

(57) ABSTRACT

A method, system, and article of manufacture for performing computation on an electronic message without the involvement of a user is provided. By including a command instruction in an electronic message which identifies an application provider for performing the computation and includes parameters and values to indicate what information is to be provided to the application provider, the message can be sent by a user and computation can be performed without the involvement of the user. The method, system, and article of manufacture is designed to intercept the message, control the computation, modify the message, and deliver it to the intended recipients.

18 Claims, 13 Drawing Sheets

OTHER PUBLICATIONS

Funfrocken Stefan: "How to Integrate Mobile Agents into Web Servers" Proceedings: Sixth IEEE Workshops on Enabling Technologies: Infrastructure for Collaborative Enterprises, IEEE Computer Society, Cambridge, MA and Los Alamitos, CA, Jun. 1997, pp. 94-99.

Borenstein, Nathaniel S., "Computational Mail as Network Infrastructure for Computer-Supported Cooperative Work," *CSCW 92 Proceedings*, Nov. 1992, pp. 67-74.

Gold, Eric, "Envoys in Electronic Mail Systems," *Proceedings of ACM SIGOIS*, 1986, pp. 2-10.

Goldberg, Yaron; Safran, Marilyn and Shapiro, Ehud, "Active Mail—A Framework for Implementing Groupware," *CSCW 92 Proceedings*, Nov. 1992, pp. 75-83.

Malone, Thomas W.; Grant, Kenneth R. and Turbak, Franklyn A., "The Information Lens: An Intelligent System for Information Sharing in Organizations," *CHI'86 Proceedings*, Apr. 1986, pp. 1-8.

Hollan, Jim and Stornetta, Scott, "Beyond Being There," *CHI'92*, May 3-7, 1992, pp. 119-125.

Milewski, Allen E. and Smith, Thomas M., "An Experimental System for Transactional Messaging," *Proceedings of ACM*, 1997, pp. 325-330.

Shepherd, Allan; Mayer, Niels and Kuchinsky, Allan, "Strudel—An Extensible Electronic Conversation Toolkit," *CSCW 90 Proceedings*, Oct. 1990, pp. 93-104.

* cited by examiner

500

510  520  530  540 http://www.host.com/file?parameters=true

820 — To: kdoe@hismail.com
830 — CC: bdoe@hermail.com
810 — From: jdoe@mymail.com 840 — Subject: Preamble to the Constitution 850 — http://www.service.com/translate?language=french&TD-REQ-BODY=true 860 — We the people of the United States, in order to form a more perfect union, establish justice, insure domestic tranquility, provide for the common defense, promote the general welfare, and secure the blessings of liberty to ourselves and our posterity, do ordain and establish this Constitution for the United States of America.

jdoe

820 — To: kdoe@hismail.com
830 — CC: bdoe@hermail.com
810 — From: jdoe@mymail.com 880 — Subject: Preamble to the Constitution 860 — We the people of the United States, in order to form a more perfect union, establish justice, insure domestic tranquility, provide for the common defense, promote the general welfare, and secure the blessings of liberty to ourselves and our posterity, do ordain and establish this Constitution for the United States of America.

870 — Nous le peuple des Etats-Unis, afin de former une union plus parfaite, établissons la justice, assurons la tranquilité domestique, prévoyons la défense commune, favorisons le bien-être général, et fixons les bénédictions de la liberté à nous-mêmes et à notre posterity, faisons l'ordain et établissons cette constitution pour les Etats-Unis d'Amérique.

jdoe

820 — To: kdoe@hismail.com
830 — CC: bdoe@hermail.com
810 — From: jdoe@mymail.com 840 — Subject: Preamble To the Constitution 860 — We the people of the United States, in order to form a more perfect union, establish justice, insure domestic tranquility, provide for the common defense, promote the general welfare, and secure the blessings of liberty to ourselves and our posterity, do ordain and establish this Constitution for the United States of America.

jdoe

Translate.url

820 — To: kdoe@hismail.com
830 — CC: bdoe@hermail.com
810 — From: jdoe@mymail.com 940 — Subject: Préambule à la constitution 970 — Nous le peuple des Etats-Unis, afin de former une union plus parfaite, établissons la justice, assurons la tranquilité domestique, prévoyons la défense commune, favorisons le bien-être général, et fixons les bénédictions de la liberté à nous-mêmes et à notre posterity, faisons l'ordain et établissons cette constitution pour les Etats-Unis d'Amérique.

jdoe

FIGURE 9B

ACTIVE ELECTRONIC MESSAGING SYSTEM

FIELD OF THE INVENTION

The present invention is related to the field of adding computation and functionality to an electronic message.

BACKGROUND

The Internet is perhaps the most important information access mechanism to be introduced to the general public in the $20^{th}$ Century. Individuals currently use the Internet to obtain information such as news, sports scores, stock quotes, and other public and private interest materials. Additionally, the Internet provides an endless abundance of images, audio, video and data files which can be downloaded used and shared between individuals.

In addition to obtaining information and other materials, the Internet provides a quick way of communicating with other individuals electronically. Individuals can transmit messages to other individuals located at practically any place in the world and the message will be received in a matter of minutes, if not sooner.

Typically, an individual can communicate electronically by typing in text to a message and addressing the message to the intended recipient(s). Generally, during delivery a message sent by a user often travels through several different computers, servers, and other computing devices which make-up the Internet before it reaches its ultimate destination. In addition to typing text into a message, a user can manually attach files, documents, and other pieces of information which will arrive with the message.

With the evolution of electronic messages as a frequently-used way of communicating, and the computation and functionality available over the Internet there is a desire to integrate the two, thereby allowing computation to be performed and files, images, audio, and other information attached to a message being delivered without the involvement of a user.

Until now, if a user wished to send a message to a person who understands a different language, the user typically would first translate the message to the recipient's native language prior to sending. There are many ways of converting text from one language to another. For example, there are applications available over the Internet which allow a user to input text in one language and select a desired language translation and the application converts the text.

To send a message in a different language using the above example, the user would first access the Internet, locate the application which will perform the computation, such as www.altavista.com/babelfish, insert the desired text to be converted, copy the resulting translation, then access a message transmission application, paste the converted text to the message and then finally send the message.

Additionally, until now, if the user wished to have a To-Do list record that they are awaiting a reply to the message they would, in addition to the above procedure, manually access their To-Do list and include such a reminder.

Similar to the above examples, there are countless computations and functions which are available over the Internet which a person must manually access to receive the benefit of these applications.

Therefore, it is desirable to produce a system which can integrate the computation and functionality of the Internet with electronic message transmission to allow computation and functionality to be performed on and attached to messages without manual involvement from a user.

SUMMARY

Roughly described, an aspect of the invention comprises a method for enhancing the functionality of an electronic message. The method includes the steps of receiving the electronic message, obtaining a command instruction from the electronic message, and performing a function responsive to the command instruction.

In another aspect, the command instruction indicates a service, application provider, and the information needed by the application provider to perform a function on an electronic message.

According to still another aspect of the present invention, an article of manufacture is provided. The article of manufacture includes an information storage medium wherein information is stored for programming a computer to perform a method of enhancing the functionality of an electronic message. The method comprises the steps of receiving the electronic message, obtaining a command instruction from the electronic message, and performing a function responsive to the command instruction.

According to still another aspect of the present invention, an article of manufacture including an information storage medium wherein is stored information for programming a computer is provided. The information includes information for programming the computer to receive an electronic message having a destination address, alter the destination address of the message, and send the message based on the altered destination address.

In still another aspect, the invention comprises an apparatus for providing a function responsive to receiving a Request. The apparatus includes a processor and a processor readable storage medium in communication with the processor. The processor readable storage medium contains processor readable program code for programming the apparatus to perform the method of providing a function responsive to receiving a Request. The method comprises the steps of receiving the Request, performing a function responsive to an instruction included in the Request, and preparing a Response subsequent to performing the function.

BRIEF DESCRIPTION OF THE DRAWINGS

The invention will be described with respect to the particular embodiments thereof. Other objects, features, and advantages of the invention will become apparent with reference to the specification and drawings in which:

FIG. 5 illustrates a command instruction, according to an embodiment of the present invention;

FIG. 8A is an illustration of a message upon which computation is to be performed, according to an embodiment of the present invention;

FIG. 8B is an illustration of a message upon which computation has been performed, according to an embodiment of the present invention;

FIG. 9A is another illustration of a message upon which computation is to be performed, according to an embodiment of the present invention; and FIG. 9B is another illustration of a message upon which computation has been performed, according to an embodiment of the present invention.

DETAILED DESCRIPTION

The method and system described herein, generally known as "message functionality technology," allows the computation and functionality available through the Internet and elsewhere to be integrated with a user's message. Embodiments of the present invention allow a user to continue to use an existing message transmission application, such as an e-mail application, or instant messaging in a similar manner to that which they are currently using.

"Computation and functionality" as described herein may be any type of application or file which is accessible by message functionality technology. For example, computation and functionality may be a service, such as language translation, updating a To-Do List, searching for keywords, replacing words with Internet links to related items, an image, audio file, video file, recording progression or a state change in a workflow system, or any other type of file which may be attached or included in a message, and any other type of service or information accessible by message functionality technology.

A "command instruction" as described herein may be any type of information which is included in a message which informs message functionality technology that a desired computation or function is to be performed. For example, the command instruction may be included in the body of the message, in the subject line, or any other portion of the message. Alternatively, the command instruction may be in the form of a file which is attached to the message. For example, the command instruction may be a word file, an Internet shortcut file, text file, .csv file, or any other type of file which can be configured to provide information to message functionality technology that a desired computation or function is to be performed.

Overview

Figure 1A:
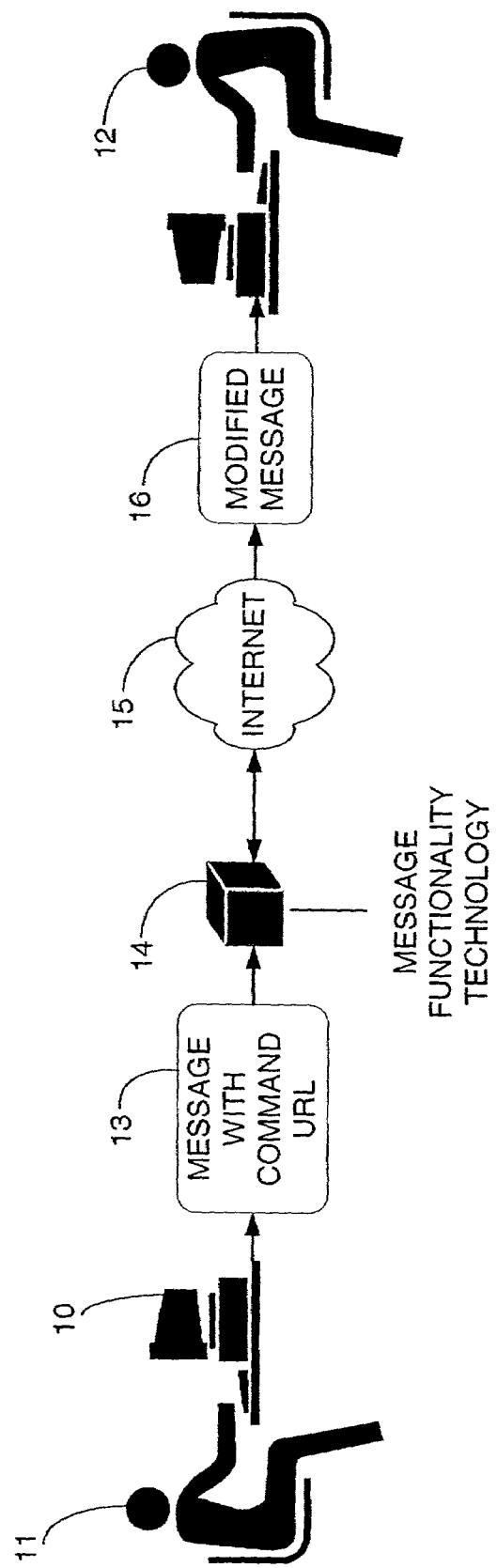
FIG. 1A is a generalized block diagram illustrating the delivery of a message on which computation is to be performed, according to an embodiment of the present invention.

FIG. 1A is a block diagram illustrating the delivery of a message on which computation is to be performed, according to an embodiment of the present invention. A computing device 10 allows a user 11 to prepare an electronic message 13 for delivery to another user 12. User 11 wishes to have a computation which is available through the Internet performed on message 13 prior to it being delivered to user 12. Message functionality technology 14 receives message 13 from user 11 and controls the computation which is to be performed using computationality services (such as translating text, or attaching an image to the message) available through Internet 15 and prepares a modified message 16 to be delivered to user 12. Message functionality technology 14 allows a user 11 to prepare and send a message without having to manually perform the desired computation or function.

In an alternative embodiment, message 13 may be transmitted through Internet 15 both prior to and after it has reached message functionality technology 14.

It will be understood that the method and system described herein is not limited to the above description. For example, the computation to be performed on message 13 is not limited to that available over Internet 15. Message functionality technology 14 may determine that computation is to be performed by another individual or no computation is to be performed at all. For example, the computation of language translation may be performed by an individual who offers such a service. Additionally, modified message 16 need not be delivered to another user 12. Modified message 16 may be sent to a fax machine, an Internet bulletin board, returned to user 11, or not sent at all.

While the scope of the present invention extends far beyond use with the Internet, the Internet is used to exemplify embodiments of the present invention. Alternatively, embodiments of the present invention may be implemented on any type of end-to-end communication channel. For example, embodiments of the present invention may be implemented to function with an instant messaging system, or an internal network, such as a Local Area Network ("LAN"), accessing internal network computation and functional applications. In still other embodiments, message functionality technology 14 and computational and functional applications may all be implemented and accessed on a single device, such as a server.

Embodiments of the present invention may be implemented to perform at least the following examples for adding computationality and functionality to an electronic message.

First, a user can have computation or functions added to an electronic message by simply adding an attachment or command line to the message.

Second, a user can prepare a message in the English language and have it translated into a second language, such as French, prior to it being delivered.

Third, a user may include an attachment to a message which will update a To-Do List which is maintained within the Internet. By updating a To-Do List, the user will be reminded of the necessary information regarding the message that was sent.

Fourth, a user may include an attachment to inform message functionality technology to attach a picture, cartoon, audio file, video file, or other type of image to the message prior to delivery, thereby adding personality and individuality to the message.

Fifth, a user may wish to have news, stock information, sports scores, or other types of information included in a message when it is being delivered. Using an embodiment of the present invention, a user does not need to manually search the Internet to find the necessary information and manually attach it to the message.

Sixth, a user may wish to have the message searched for keywords that relate to other information, such as news, and have those keywords replaced with shortcuts to a web-site which includes information related to the keyword.

Seventh, in an embodiment, a follow-up message or a reminder may be sent after a set period of time after the original message without any input from a user.

Eighth, in an embodiment, message functionality technology can be implemented to archive messages for sharing, publishing, processing, and billing.

Ninth, message functionality technology can be implemented using any computing device which has Internet connectivity and provide these features to as many different users as desired without having to manually update each individual user's computing device. For example, message functionality technology could be implemented on a company's server and provide the features of this technology to all the employees which have computers connected to the server, without having to manually update each computer within the company.

A wide variety of functions and computations can be easily added to a user's electronic message. In an embodiment, if the function or computation is available to message functionality technology, the function or computation can be easily added and performed on a message without user involvement.

The following is an example of how an embodiment of the present invention could be utilized.

Alice, a manager in a large engineering firm in Silicon Valley, wishes to send an electronic message to a colleague, Bob, in a foreign country. She wants the message to arrive containing a translation into Bob's native language. Alice prepares the message as usual, but before sending the message to Bob she attaches a file called "Translate into French.url." When Alice presses the "send" button on her machine, the message is transmitted just as it would be using typical message transmission techniques.

Message functionality technology 14 receives the electronic message, opens the command attachment and POSTS the appropriate portion of the message to an application provider that translates the body of the message into Bob's native language, for example French, receives the translated text and then appends this French translation to the end of the original electronic message and forwards the modified message on to Bob.

Alice has accomplished the process of translating her electronic message into Bob's native language by simply attaching a file to the message. Message functionality technology 14 performs the rest of the necessary computation without any additional input from Alice.

Within this message that Alice has sent to Bob is a request for information critical to her job, and she wants to be sure Bob replies to her within the next three business days. In addition to attaching the file "Translate into French.url" to the message, she also included a file called "Deadline 3 days.url."When message functionality technology 14 receives the message, in addition to doing the necessary language translation, it passes the message to a deadline tracking application which notes the fact that Alice wishes to receive a response to this message within the next three business days. If three business days pass and message functionality technology 14 has not seen a reply to Alice's message, a new electronic message is sent to Alice to remind her that she wanted a reply from Bob.

Message functionality technology 14 allows Alice to easily send Bob a critical message concerning her job which is translated into Bob's native language and also ensures that she is reminded that she wished to receive a reply from Bob within three business days.

Computing Device Architecture

Figure 1B:
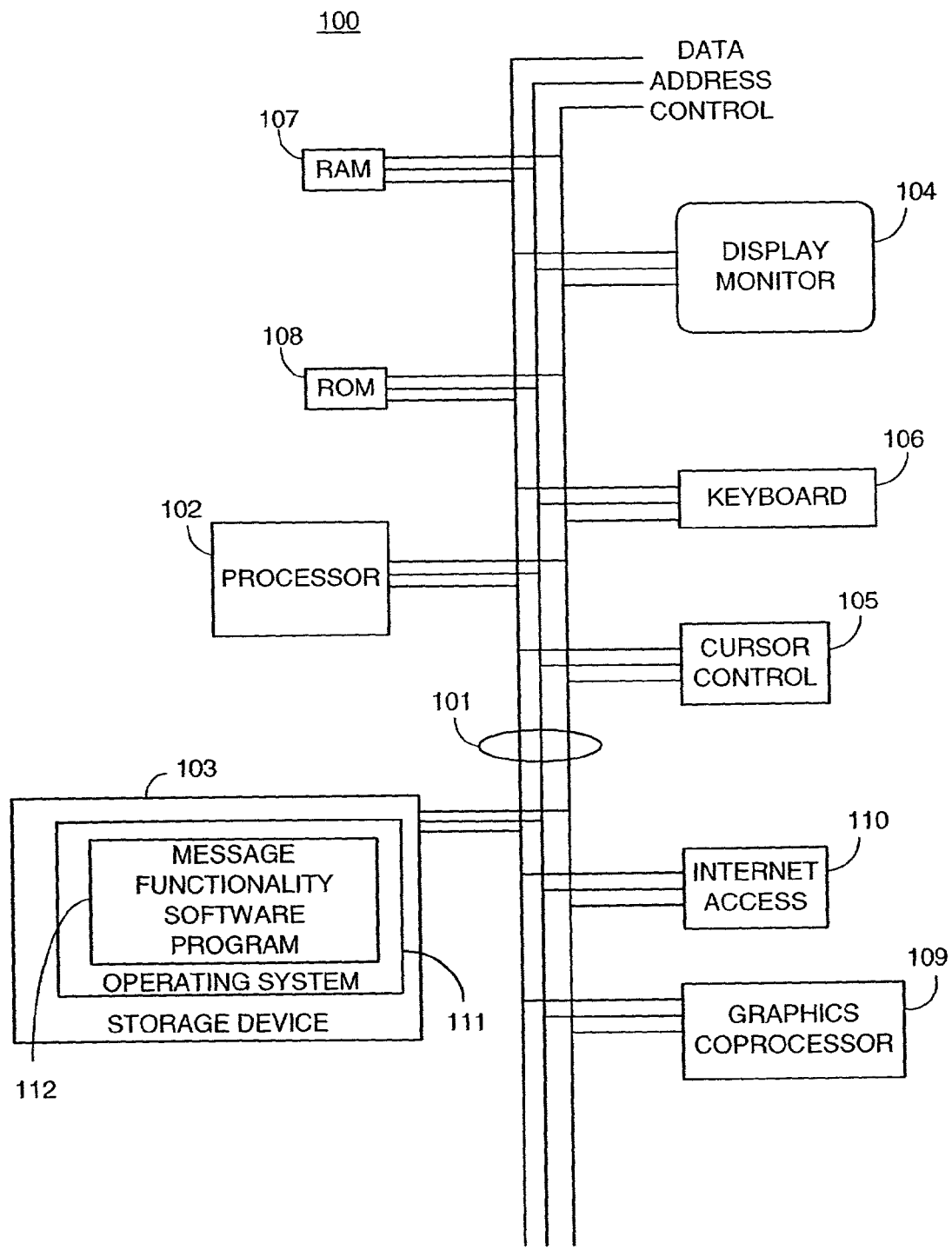
FIG. 1B is a generalized block diagram illustrating a computing device architecture suitable for implementing various embodiments of the present invention.

FIG. 1B illustrates a computing device architecture 100 suitable for implementing some embodiments of the present invention. The computing device architecture 100 includes a processor 102, a storage device 103, and Internet access equipment 110, such as a modem. The architecture 100 may also include a display monitor 104, cursor control device 105, random access memory 107, ROM memory 108, keyboard 106, and a graphics co-processor 109. All of the elements of the computing device architecture 100 may be tied together by a common bus 101 for transporting data between the various elements. The bus 101 typically includes data, address, and control signals.

Although the computing device architecture 100 illustrated in FIG. 1B includes a single data bus 101 which ties together all of the elements of the computer 100, there is no requirement that there be a single communication bus 101 which connects the various elements of the architecture 100. For example, the processor 102, RAM 107, ROM 108, and graphics co-processor 109 might be coupled with data bus 101 while the storage device 103, internet access 110, keyboard 106, display monitor 104, and cursor control device 105 are connected together with a second data bus (not shown). In this case, the first data bus 101 and the second data bus (not shown) could be linked by a bidirectional bus interface (not shown). Alternatively, some of the elements, such as the processor 102 and graphics co-processor 109 could be connected to both the first data bus 101 and the second data bus (not shown) and communication between the first and second data bus would occur through the processor 102 and graphics co-processor 109.

The methods of the present invention are thus executable on any computing device architecture such as the one 100 illustrated in FIG. 1B, but there is no limitation that this architecture is the only one which can execute embodiments of the present invention.

Figure 3A:
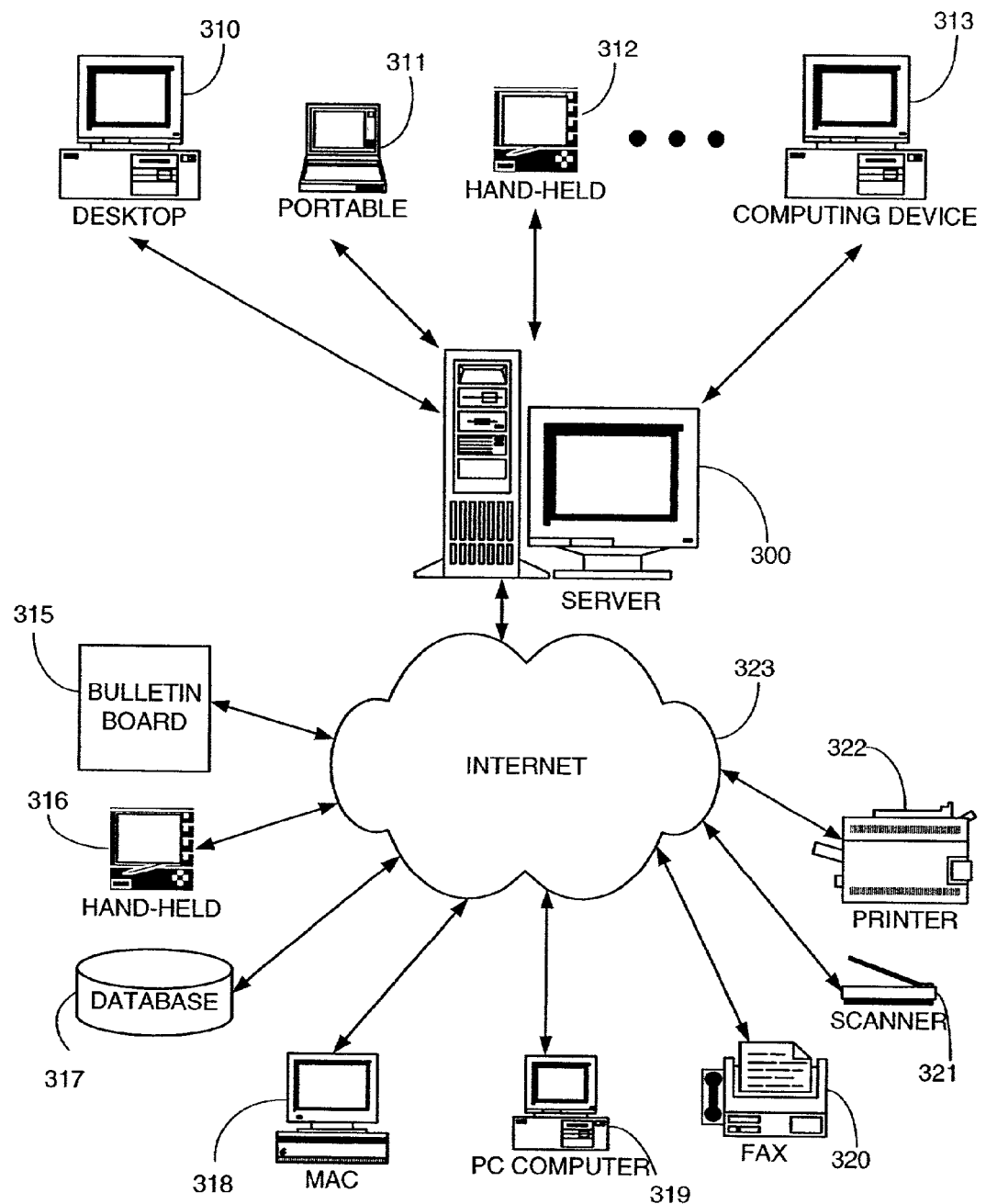
FIG. 3A is a generalized block diagram illustrating a system for implementing various embodiments of the present invention.
Figure 3B:
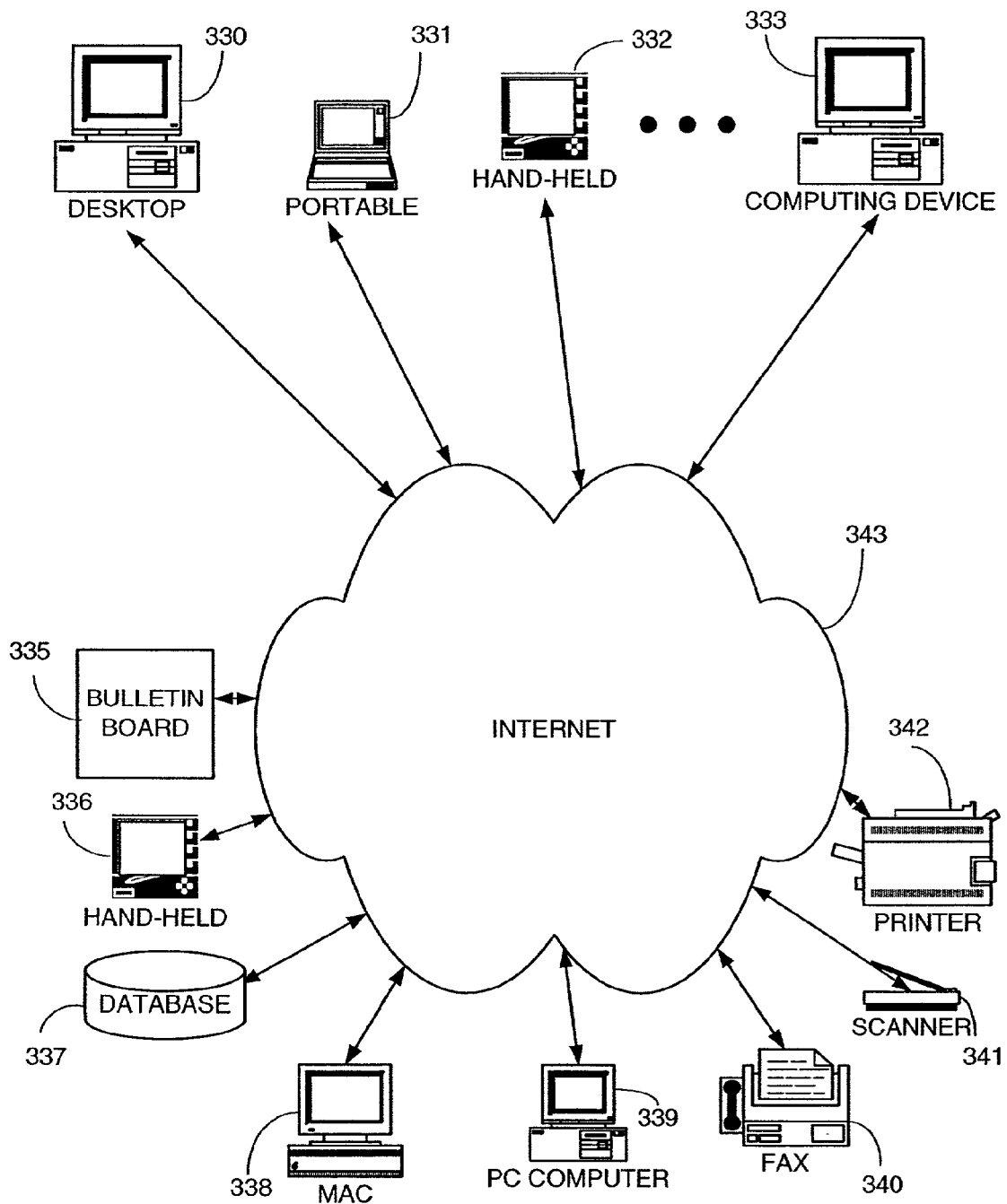
FIG. 3B is another generalized block diagram illustrating a system for implementing various embodiments of the present invention.
Figure 3C:
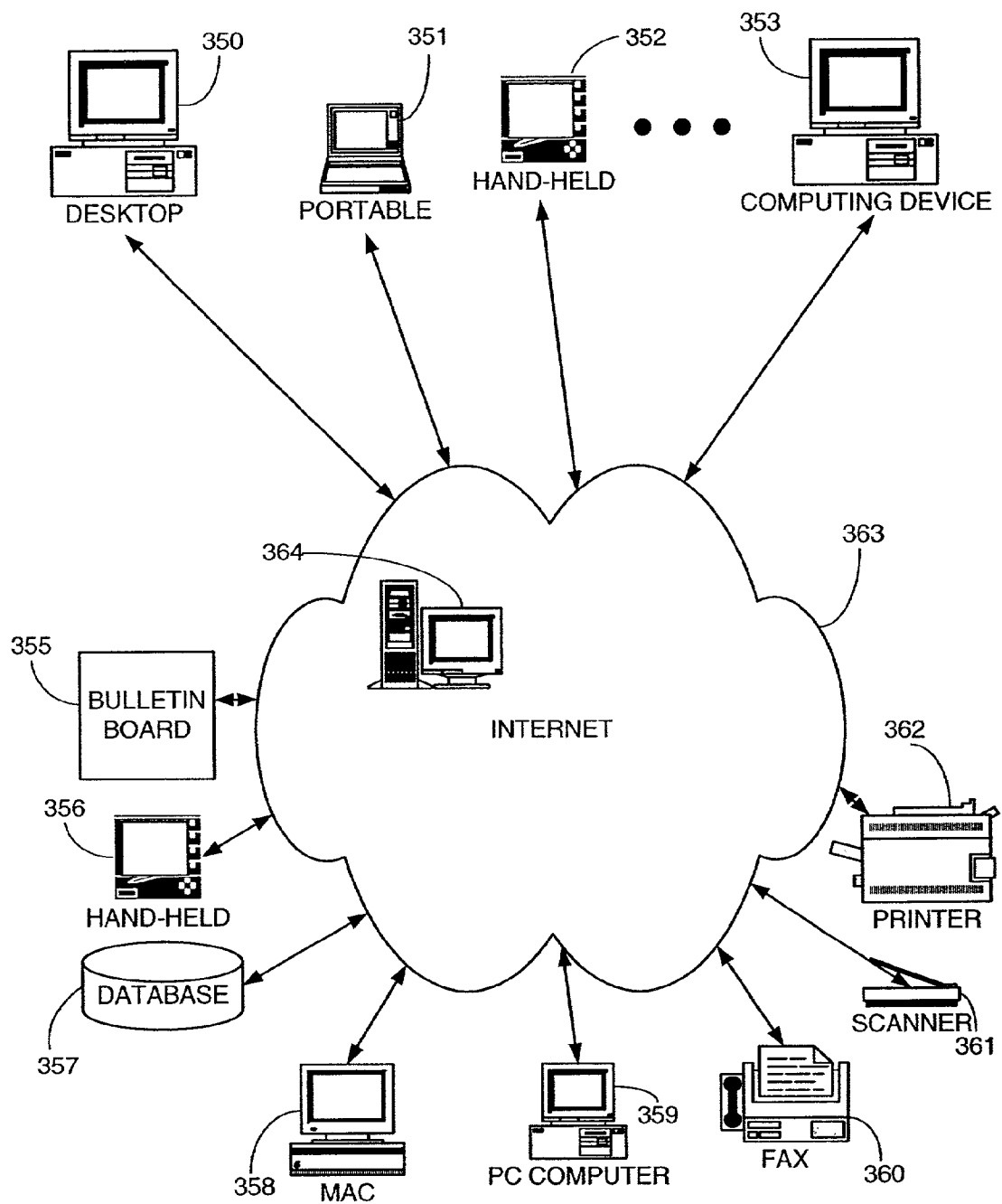
FIG. 3C is still another generalized block diagram illustrating a system for implementing various embodiments of the present invention.

In an embodiment, the computing device architecture 100 may be a server 300 which other computing devices, such as computing devices 310–313, are directly connected to, as illustrated in FIG. 3A, a server 364 which is part of the Internet, as illustrated by FIG. 3C, or any other type of computing device, such as computing devices 330–333, as illustrated in FIG. 3B.

In an embodiment of the present invention, the storage device 103 may be an article of manufacture, such as a computer readable medium. For example, storage device 103 may be a magnetic hard disk, an optical disk, a floppy disk, CD-ROM (Compact Disk Read-Only Memory), RAM (Random Access Memory), ROM (Read-Only Memory), or other readable or writeable data storage technologies, singly or in combination.

The storage device 103 may include an operating system 111, such as Microsoft Windows® or Unix®, wherein the operating system 111 is capable of executing programs or applications using the computing device architecture 100. An embodiment of the present invention is implemented as message functionality software program 112, and is stored on storage device 103. In an embodiment, message functionality software program 112 is configured to intercept all electronic messages being sent through computing device architecture 100 and controls specific functions or computations which are performed on the electronic message without input from a user.

As will be understood, embodiments of the present invention, such as message functionality software program 112, maybe in the form of a software program, a software object, a software function, a software subroutine, a software method, a software instance, a code fragment, a hardware operation or user operation, singly or in combination. Additionally, message functionality software program 112 may be implemented using one, two, or any number of computing devices 100.

Preparing and Delivering a Message

Figure 2:
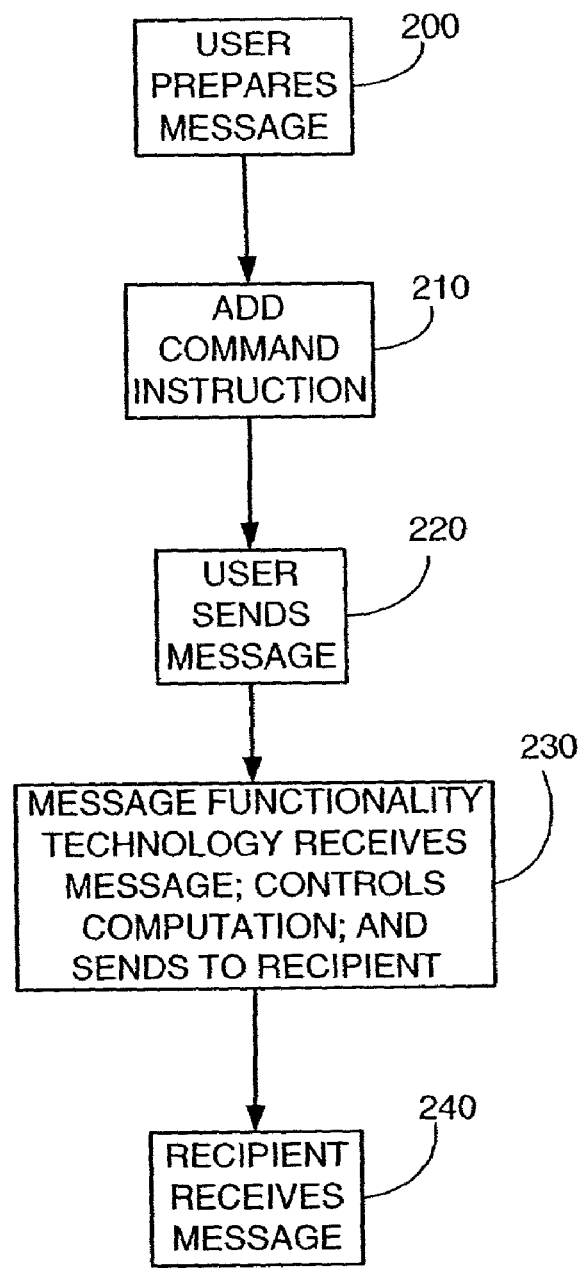
FIG. 2 is a flow chart illustrating steps for preparing and delivering a message on which computation is to be performed, according to an embodiment of the present invention.

In an embodiment, a message on which computation is to be performed is prepared and delivered according to the flow chart illustrated in FIG. 2.

Figure 3D:
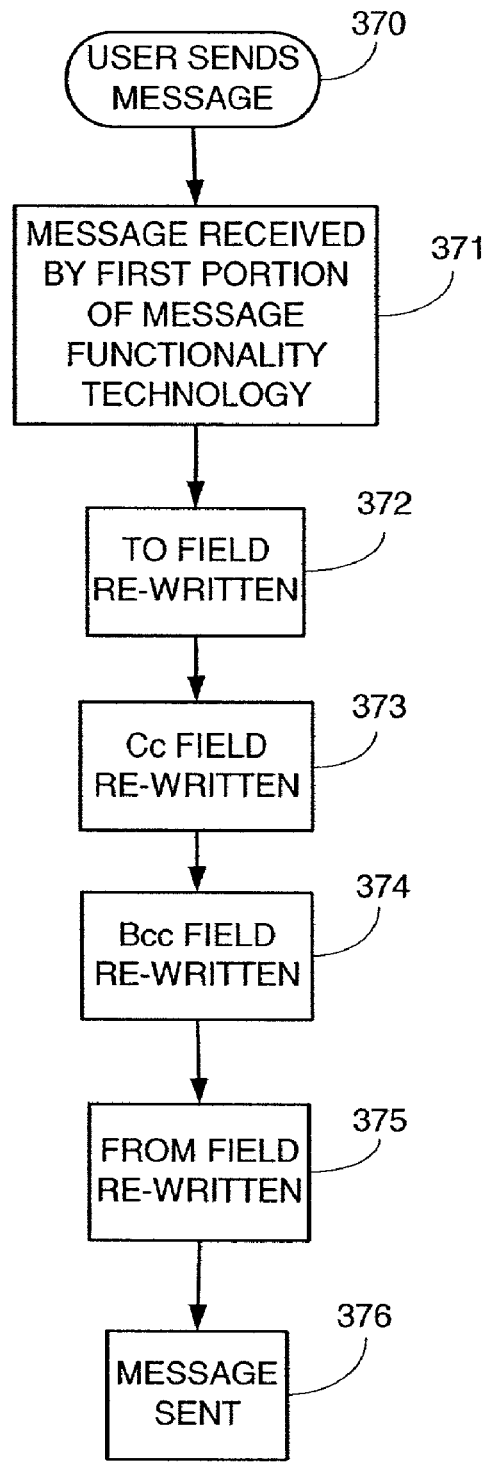
FIG. 3D is a flow chart illustrating the steps for re-routing a message, according to an embodiment of the present invention.
Figure 6:
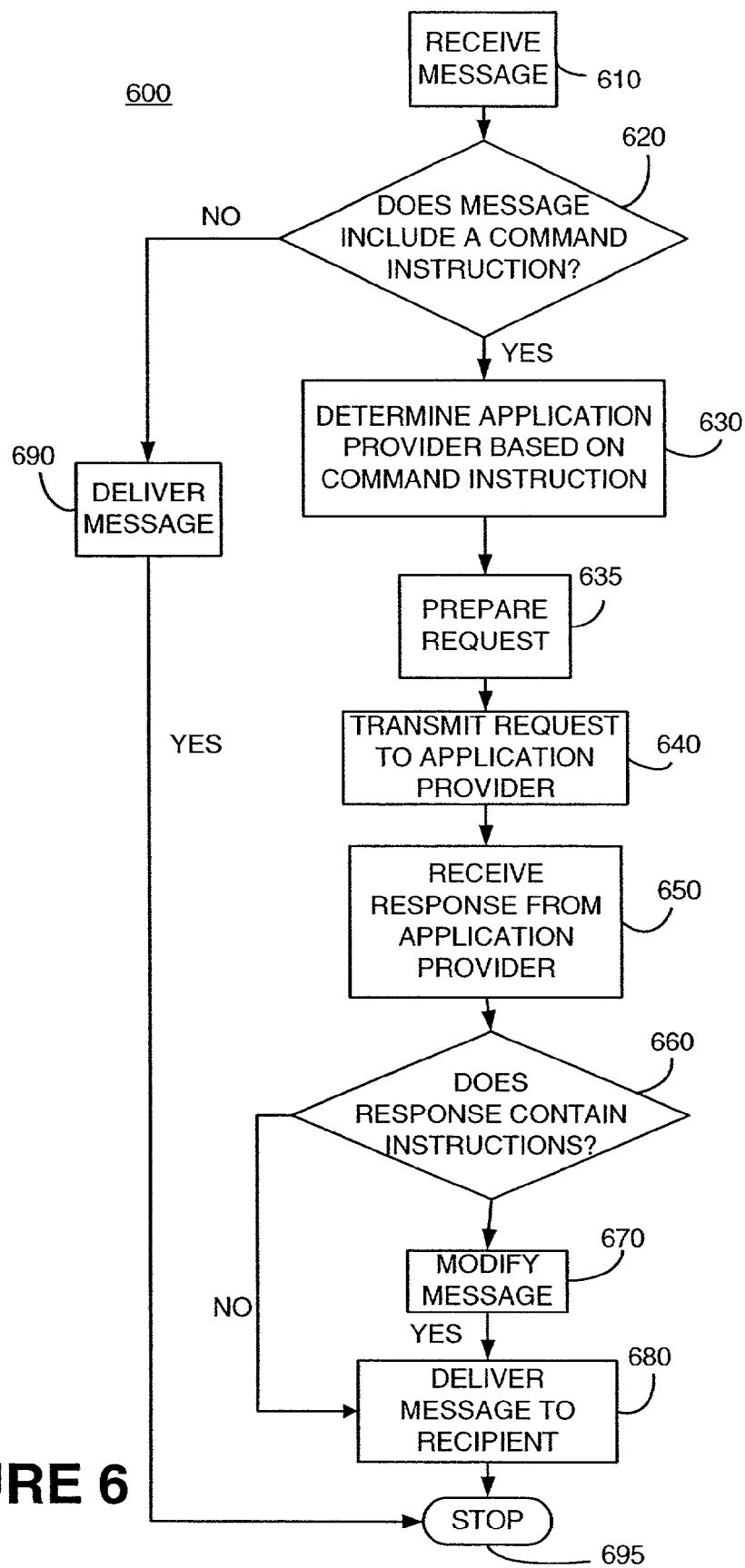
FIG. 6 is a flow chart illustrating the steps for controlling the computation performed on a message, according to an embodiment of the present invention.

As one who is skilled in the art will appreciate, FIGS. 2, 3D, and 6 illustrate logic boxes for performing specific functions. In an alternate embodiment, more or fewer logic boxes may be used. In an embodiment of the present invention, a logic box may represent a portion of message functionality software program 112 illustrated in FIG. 1B, or any portion of other embodiments of message functionality technology.

A user prepares a message on which computation is to be performed, as illustrated by logic block 200. While preparing the message, the user includes a command instruction with the message to be delivered, as illustrated in logic block 210.

Once the user has completed preparing the message and attached the command instruction as illustrated in logic blocks 200 and 210, the user then sends the message, as illustrated by logic block 220. This is all that a user is required to do in sending a computationally-enhanced message in accordance with an embodiment of the present invention.

In an embodiment, a user may perform the steps illustrated as logic boxes 200–220 using a computing device such as any one of computing devices 310–313 of FIG. 3A, computing devices 330–333 of FIG. 3B, computing devices 350–353 of FIG. 3C, or any other type of device which is typically used in sending an electronic message.

Logic block 230 illustrates message functionality technology 14 receiving the message and controlling the necessary computation of the message. Once the computation has been completed, the message is modified and delivered. The message may be delivered to as many recipients as designated, not delivered at all, returned to the user, or delivered to any other accessible location.

In an embodiment, message functionality technology 14 may be implemented on server 300 of FIG. 3A, any one of computing devices 330–333 of FIG. 3B, or server 364 of FIG. 3C, for performing the steps illustrated as logic box 230.

Logic block 240 illustrates a recipient receiving the message with the computation already performed. In an embodiment, the command instruction is removed from the modified message and the recipient does not know whether the message they have received has been modified. Alternatively, the command instruction may be included in the modified message and the receiving party will know that the message has been modified. In such an embodiment, the receiving party can save the command instruction and later attach it to their own messages which they wish to have computed in a similar fashion. As discussed above, the message may not be delivered to a user but may be delivered to any location such as any one of computing devices 315–322 of FIG. 3A, computing devices 335–342 of FIG. 3B, computing devices 355–362 of FIG. 3C, or not delivered at all. Additionally, the message may be delivered to multiple different locations.

Intercepting The Message

FIGS. 3A–3C represent generalized block diagrams of different systems for implementing various embodiments of the present invention.

FIG. 3A illustrates an embodiment of the present invention where message functionality technology 14 has been implemented on server 300, which is in communication with Internet 323.

User 11 may use desktop computer 310, portable computer 311, hand-held computer 312, or any other type of computing device 313 which communicates with server 300, and thereby obtain the benefits of message functionality technology 14.

The list of different computing devices 310–313 which may be used by user 11 is illustrated for example purposes only, and is not intended to be an all-inclusive list of the different types of devices which may be used with an embodiment of the present invention. User 11 may use any type of computing device which is capable of accessing server 300.

The devices 310–313 may be used in embodiments of the present invention without changing their previously-existing software or hardware. For example, user 11 may use desktop computer 310 which includes an e-mail application, to send a message on which computation is to be performed. After the message is sent, it is received by message functionality technology 14 located on server 300. Message functionality technology 14 controls the necessary computation and delivers the message to its intended recipients.

In addition to delivering the message to a computing device such as a hand-held computer 316, Mac computer 318, or PC computer 319, the attachment may instruct message functionality technology 14 to post the message on a bulletin board 315, store it in a database 317, send it to a fax machine 320, scanner 321, printer 322, return it to user 11, not deliver the message at all, or deliver the message to any other location or device.

FIG. 3B illustrates another embodiment of the present invention where message functionality technology 14 is implemented on any one of devices 330–333, which may be desktop computer 330, portable computer 331, hand-held computer 332, or any other type of computing device 333 which communicates with the Internet 343.

The list of different computing devices 330–333 which maybe used by user 11 is illustrated for example purposes only, and is not intended to be an all-inclusive list of the different types of devices which may be used with an embodiment of the present invention. User 11 may use any type of computing device which is capable of accessing Internet 343. For example, user 11 may use desktop computer 330 to send an electronic message on which computation it is to be performed. Once the message is sent, it is received by message functionality technology 14 which is located on the desktop computer 330. Message functionality technology 14 controls the necessary computation and delivers the message to its intended recipient.

In addition to sending the message to a computing device such as a hand-held computer 336, Mac computer 338, or PC computer 339, the attachment may instruct message functionality technology 14 to post the message on a bulletin board 335, store it in a database 337, send it to a fax machine 340, scanner 341, printer 342, return it to user 11, not deliver the message at all, or deliver the message to any other location or device.

FIG. 3C illustrates a block diagram of still another embodiment of the present invention where message functionality technology 14 is implemented on both a computing device, such as one of computing devices 350–353 and server 364, which is part of Internet 363. The computing device maybe desktop computer 350, portable computer 351, hand-held computer 352, or any other type of computing device 353 which communicates with Internet 363. Computing device 350–353 may access Internet 363 with a modem and dial-up connection, through a local server, or by any other technique commonly used to access Internet 363.

The list of different computing devices 350–353 which maybe used by user 11 is illustrated for example purposes only, and is not intended to be an all-inclusive list of the different types of devices which may be used with an embodiment of the present invention. User 11 may use any type of computing device which is capable of accessing Internet 363. For example, user 11 may use desktop computer 350 to send an electronic message on which computation it is to be performed.

In sending the message, the message is received by a first portion of message functionality technology 14 which is located on computing device 350–353 from which the message originates. The first portion of message functionality technology 14 re-routes the message so that it is initially delivered to server 364, which includes a second portion of message functionality technology 14. In an embodiment, the first portion of message functionality technology 14 is implemented as a client-side plug-in or a macro. Alternatively, the first portion of message functionality technology 14 may be located on a server in communication with computing device 350–353 which initially receives the message.

The second portion of message functionality technology 14 located on server 364 receives the re-routed message and controls the necessary computation and delivers the message to its intended recipient.

In addition to sending the message to a computing device such as a hand-held computer 356, Mac computer 358, or PC computer 359, the attachment may instruct the second portion of message functionality technology 14 to post the message on a bulletin board 355, store it in a database 357, send it to a fax machine 360, scanner 361, printer 362, return it to user 11, not deliver the message at all, or deliver the message to any other location or device.

FIG. 3D illustrates a flowchart for re-routing a message from a computing device, such as one of computing devices 350–353, to server 364 of FIG. 3C, according to an embodiment of the present invention. As described above with respect to FIGS. 3A and 3B, and in other embodiments, re-routing the message is not required.

In logic block 370 the process is initiated by a user sending a message.

In logic block 371 the message sent by the user in logic block 370 is received by a first portion of message functionality technology 14. In an embodiment, the first portion of message functionality technology 14 is located on the computing device from which the message is sent. Upon receipt of the sent message control is passed to logic block 372. In an alternative embodiment, the first portion of message functionality technology may be located on an intermediate device, such as a server, which initially receives the message from the computing device.

In an embodiment, there is no determination made as to whether computation is to be performed on the message. In this embodiment all messages are re-routed through server 364 (FIG. 3C). In an alternative embodiment, the message may be searched to determine whether computation is to be performed. If it is determined that no computation is to be performed then the message is delivered to the intended recipients without being re-routed.

In logic block 372 the To field of the message is re-written so that the message will be initially delivered to server 364. For example, if a user 11 prepared and sent an electronic message to kdoe@hismail.com, the To field would include the address kdoe@hismail.com. In logic block 372 the To field is re-written so that it reads kdoe#hismail.com@server364.com. By re-writing the To field the message will initially be delivered to server 364.

In logic block 373 the Cc field of the message is re-written in a similar fashion to that described with relation to logic block 372. For example, if the Cc field includes the address bdoe@mymail.com, it will be re-written to read bdoe#mymail.com@server364.com. By re-writing the Cc field all replies to the message being ultimately delivered which are addressed to recipients listed in the Cc field will be routed through server 364 prior to being delivered to their ultimate destination. In an alternative embodiment, the Cc field is not altered and replies are delivered directly to the user.

In logic block 374 the Bcc field of the message is re-written in a similar fashion to that described with relation to logic blocks 372 and 373. For example, if the Bcc field includes the address bcdoe@mymail.com, it will be rewritten to read bcdoe#mymail.com@server364.com. By re-writing the Bcc field all replies to the message being ultimately delivered which are addressed to recipients listed in the Bcc field will be routed through server 364 prior to being delivered to their ultimate destination. In an alternative embodiment, the Bcc field is not altered and replies are delivered directly to the user.

In logic block 375 the From field of the message is re-written in a similar fashion to that described with relation to logic blocks 372, 373 and 374. For example, if the From field includes the address jdoe#mymail.com, it will be re-written to readjdoe#mymail.com@server364.com. By re-writing the From field all replies to the message being ultimately delivered which are addressed to the sending party listed in the From field will be routed through server 364 prior to being delivered to their ultimate destination. In an alternative embodiment, the From field is not altered and replies are delivered directly to the user.

In addition to ensuring that replies to the ultimately delivered message are routed through message functionality technology, in an embodiment message functionality technology may receive different command instructions for each field. For example, message functionality technology may receive instructions that the message to be delivered to recipients in the To field should have a French translation of the body included in the message, the message to be delivered to the recipients listed in the Cc field should include a Spanish translation of the body and the recipients listed in the Bcc field should receive the message unaltered. By modifying each field, message functionality technology can perform different computations and functions with respect to the same message for different recipients without the involvement of the sender.

Once the address fields have been re-written control is passed to logic block 374 and the message is sent from the computing device using typical transmission techniques, and is intercepted by the second portion of message functionality technology 14, located on server 364.

In each of the above embodiments, illustrated in FIGS. 3A–3C, it is ensured that each message, and reply to each message is routed through message functionality technology. Routing each original message through message functionality technology ensures that the desired computation or function is performed prior to delivery.

Additionally, ensuring that replies to messages are routed through message functionality technology allows message functionality technology to provide additional functionality and computation to a user 11. For example, returning to the example of Alice delivering a message to Bob, a foreign colleague, Alice wished to receive a reply from Bob within three business days. By routing all replies to Alice's message through message functionality technology, message functionality technology can determine whether Bob has replied. If a reply from Bob is not detected by message functionality technology within three business days, message functionality technology will notify the application provider which is performing the function of assuring a reply is received and a new message will be delivered to Alice to remind her that she wished to receive a response.

Computations and Functions

Figure 4:
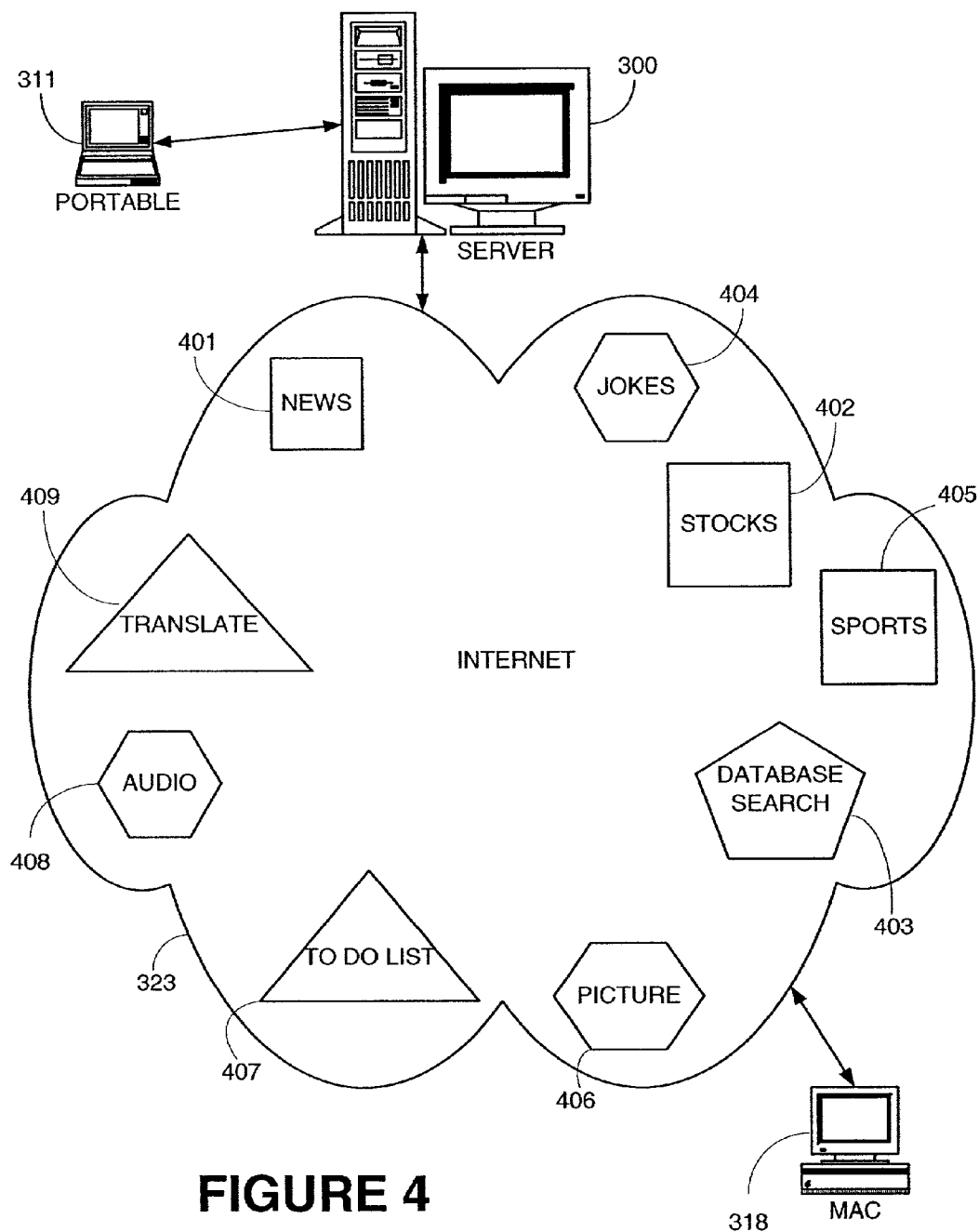
FIG. 4 is an example of an expanded view of FIG. 3A, according to an embodiment of the present invention.

FIG. 4 illustrates an example of an expanded view of a portion of FIG. 3A showing portable computer 311, server 300, Mac computer 318, and Internet 323, according to an embodiment of the present invention. Internet 323 includes a multitude of different types of functions, attachments and computing devices which may be included and performed on messages being sent electronically. For example, Internet 323 includes news 401, stock information 402, database searches 403, jokes 404, sports information 405, pictures 406, to-do lists 407, audio clips 408, translation services 409, and many other types of computation services and functional features.

Any service, function, image, audio clip, or other type of data which may be accessed by message functionality technology may be attached to and performed on an electronic message which is being delivered, according to embodiments of the present invention.

FIG. 5 illustrates a command instruction implemented as a URL 500, according to an embodiment of the present invention. In an embodiment, URL 500 may be included in the message or attached to the message as a file, such as an Internet shortcut file. Internet shortcut files are well known in the art and will not be described in further detail. URL 500 includes host 510, file 520, a set of parameters 530, and associated values 540.

The host 510 and file 520 indicate to message functionality technology the service and application provider to be used in carrying out the computation. Referring to FIG. 8A, the service identified by the host in URL 850 is www.service.com (e.g., www.altavista.com), and the application provider identified by the file is translate (e.g., babelfish).

The parameter 530 and associated value 540 indicate what information the application provider will need in order to successfully carry out the computation. In FIG. 8A, the parameters are language with a value of French and TD-REQ-BODY with a value of true. In embodiments of the present invention there may be one, two, or as many parameters and associated values as are needed to inform message functionality technology what information is required by an application provider.

The parameters may be specific to the application provider, or may be parameters which indicate information to be passed to the application provider. For example, the first parameter and value in URL 850 of FIG. 8A, language=French, is specific to the translate application itself and is passed to the application provider unmodified. The second parameter and value TD-REQ-BODY=true indicates to message functionality technology that the body of the message is to be transmitted to the application provider.

Additional parameters and values may be included in URL 500 to indicate that other functions are to be performed on a message. For example, if the subject line 840 of FIG. 8A is to be translated there would be another parameter and value in URL 850 such as TD-REQ-SUBJECT=true.

In an embodiment, there are many different parameters and values which may be included in URL 500. For example, a list of parameters which may be included in URL 500, according to an embodiment of the present invention, are TD-REQ-SENDER, TD-REQ-RECIPIENTS, TD-REQ-SUBJECT, TD-REQ-DATE, TD-REQ-MESSAGEID, TD-REQ-HEADERS, TD-REQ-BODY, TD-REQ-THREAD, and TD-REQ-ATT-LIST.

It will be understood that the above list of parameters is not intended to be an all inclusive list of possible parameters but merely a list of some of the parameters which may be used in embodiments of the present invention. Additionally, the terms used in the parameters, such as TD, REQ, SENDER, RECIPIENTS, SUBJECT, DATE, MESSAGEID, HEADERS, THREAD, LIST, BODY, and ATT, are used only as descriptive examples and other terms, combination of letters, numbers or other characters may be used to indicate parameters as used with embodiments of the present invention.

It will also be understood that any designated value may be assigned to the parameters and is not limited to a value of true or false. For example, a value of 1 and 0, or any other combination of letters, characters, or other symbols may be used in assigning values to the parameters in accordance with embodiments of the present invention.

Including the above parameters with a value of true or other data in URL 500 will indicate different functions that are to be performed on a message.

For example, if the parameter TD-REQ-SENDER is given a value of true in URL 500 included in a message, then the address of the sender will be included as part of the information provided to the application provider.

Assigning a value of true to parameter TD-REQ-RECIPIENTS in URL 500 included in a message, the address(es) of the recipient(s) of the original message will be included in the information provided to the application provider.

Assigning a value of true to parameter TD-REQ-SUBJECT in URL 500 included in a message, results in the subject line of the original message being included in the information provided to the application provider.

If the parameter TD-REQ-DATE is set to a value of true in URL 500 included in a message, the date the original message was sent will be included in the information provided to the application provider.

Assigning a value of true to the parameter TD-REQ-MESSAGEID in URL 500 included in a message, results in a unique message identification being included in the information provided to the application provider.

Assigning a value of true to the parameter TD-REQ-HEADERS in URL 500 included in a message, results in the Simple Mail Transfer Protocol ("SMTP") headers of the original message being included in the information provided to the application provider.

If the parameter TD-REQ-BODY is assigned a value of true in URL 500 included in a message, then the body of the original message will be provided to the application provider.

Including the parameter TD-REQ-THREAD with a value of true in URL 500 included in a message, will indicate that Thread ID created using an embodiment of the present invention is to be provided to the application provider.

If the parameter TD-REQ-ATT-LIST is given a value of true in URL 500 included in a message, then the names of any attachments on the original message will be provided to the application provider.

In an embodiment, if parameters included in the command instruction are not recognized by message functionality technology, message functionality technology will pass these parameters on unchanged to the application provider.

In an embodiment, application providers may have a command instruction available to users so that they can easily attach the command instruction to a message. For example, a command instruction may be provided as an Internet shortcut icon available on a web page for a user to save on a computer and later attach to a message. However the command instruction is provided, the user does not need to know how to write the command instruction but can simply attach to a message a file which contains a command instruction which will perform the desired function.

For example, a provider may offer the computation of adding a cartoon to the end of a message prior to delivery. This provider may have a command instruction attachment available to users in the form of an Internet shortcut with a title of "Add Cartoon." The user would simply save this shortcut on their computer and when they desire to add a cartoon to a message all they need do is attach the shortcut to the message prior to sending. This is all that is required by the user to add the cartoon to their message. The message is received by message functionality technology, the necessary computation performed, the cartoon added, and the message delivered to its intended recipient with no additional need for input from the sending party.

FIG. 6 illustrates a flowchart 600 of the steps for controlling the computation that is to be performed on a message, according to an embodiment of the present invention.

In logic block 610 a message is received by message functionality technology 14, according to an embodiment of the present invention. Once the message is received, control is passed to logic block 620.

In logic block 620 it is determined whether the message includes a command instruction. If the result of the determination in logic block 620 is yes, control is passed to logic block 630.

If however, there is no command instruction included in the message received in logic block 610, control is passed to logic block 690 and the message is delivered to the intended recipients. Upon delivery of the message in logic block 690, control is passed to logic block 695 and the process is complete.

If it is determined in logic block 620 that the message received in logic block 610 includes a command instruction, then control is passed to logic block 630.

In logic block 630 the application provider that will perform the requested computation is determined by message functionality technology 14 based on information contained in the command instruction. In an embodiment, if the command instruction is in the form of a URL 500 (FIG. 5), the application provider is determined by message functionality technology 14 based on the host 510 and file 520 of URL 500.

In logic block 635 a "Request" is prepared by message functionality technology 14 based on instructions contained in the command instruction. In an embodiment, if the command instruction is in the form of a URL 500 (FIG. 5), the Request is prepared based on the parameters 530 and associated values 540.

In an embodiment, the Request is prepared by message functionality technology 14 in a format for transmitting using an HTTP POST command. A POST command is a transmission of a potentially large amount of data using the http (or 'web') protocol. Included in a Request are the destination, or the host plus application provider, a set of parameters with associated values as described above, and a data stream. It is understood that a Request may be prepared in a format for transmitting using other types of protocols. For example, a Request may be formatted for transmitting using Remote Method Invocation (RMI), generic sockets ("TCP/IP"), or any other type of protocol.

Referring to FIGS. 9A and 9B, a message has been received in logic block 610 by message functionality technology 14 which includes a command instruction in the form of an Internet shortcut file 910. The Internet shortcut file 910 includes three parameters and associated values: language=French, TD-REQ-SUBJECT=true, and TD-REQ-BODY=true. Since the first parameter is specific to the host service it is added by message functionality technology 14 to the headers of the Request unchanged.

The second parameter, TD-REQ-SUBJECT=true, informs message functionality technology 14 to include the subject line of the message which is being translated in the Request. Thus, message functionality technology 14 adds a header to the Request of the form TD-REQ-SUBJECT=Preamble to the Constitution.

The third parameter is TD-REQ-BODY=true. This informs message functionality technology 14 to include the body text of the associated mail message in the Request. In an embodiment, a parameter and value of TD-REQ-BODY=true is added to the header of the Request and the actual contents of the body of the message is included in the data stream part of the Request. In an alternative embodiment, a parameter of TD-REQ-BODY is added to the header of the Request and the actual contents of the body of the message is assigned to that parameter as the value.

Once the application provider has been determined and the Request prepared in logic blocks 630 and 635, control is passed to logic block 640. In logic block 640 the Request is transmitted to the application provider.

In logic block 650 a "Response" is received from the application provider as a result of the Request transmitted in logic block 640. In an embodiment, the Response may be returned in the form of a HTTP POST Response, which is formatted in a similar manner as the Request (e.g., having headers and a content data stream). It is understood that a Response may be prepared in a format for transmitting using other types of protocols. For example, a Response may be formatted for transmitting using RMI, TCP/IP, or any other type of protocol.

Returning to the above example, message functionality technology 14 anticipates receiving a Response from the translate application provider which contains both the translation of the original message, and instructions as to what should be done with that translation. The Response may have a header of the form TD-RES-APPEND-BODY=true, informing message functionality technology 14 that the content of the Response is to appended onto the end of the original message. The translated text itself may be in the data stream of the Response.

Once the Response has been received in logic block 650 control is passed to logic block 660.

In logic block 660 message functionality technology determines if there are any instructions contained in the Response received from the application provider. If there are no instructions contained in the Response, control is passed to logic block 680. If, however, there are instructions in the Response, control is passed to logic block 670.

In logic block 670 the original message is modified based on the instructions received from the application provider in logic block 660. For example, if the Response includes a parameter TD-RES-APPEND-BODY=true, message functionality technology will attach the contents of the Response object to the end of the body of the original message.

In logic block 680 the message is delivered to the intended recipients. The message resulting from the above example is illustrated as FIG. 8B, according to an embodiment of the present invention.

In an alternative embodiment, there may be multiple command instructions included with a message received by message functionality technology. If a message is received with more than one command instruction, logic steps 630–670 illustrated in FIG. 6 may be repeated for each command instruction prior to delivery of the message in logic block 680.

Additionally, in an alternative embodiment, if the parameters listed in the command instruction are not recognized by message functionality technology 14 in logic block 635, the application provider is not authorized to obtain the requested information, or there are no parameters included in the command instruction, message functionality technology performs an HTTP GET command. A GET command obtains a copy of the contents of the source identified in the command instruction. In an embodiment, the source may be a Uniform Resource Locator ("URL"). Once message functionality technology has performed the GET command, the results are attached to the message and control is passed to logic block 680, and the message with the attachment is delivered.

Figure 7A:
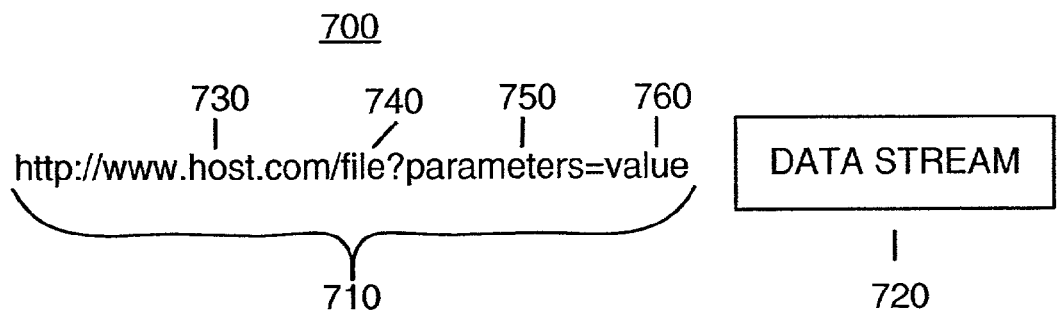
FIG. 7A is an illustration of a Request, according to an embodiment of the present invention.

FIG. 7A illustrates a Request 700 implemented as an HTTP POST Request, according to an embodiment of the present invention. Included in Request 700 is header 710 which contains host 730, file 740, parameters 750, and values 760 which are associated with each parameter. The host 730, file 740, and parameters 750 are similar to host 510, file 520 and parameters 530, described with respect to FIG. 5. The values 760 associated with each parameter 750 may be actual data content which is to be processed by an application provider, or may contain a indicator value, such as true, similar to the values 540 (FIG. 5). For example, referring to FIG. 8A if the command instruction 850 contained a parameter "TD-REQ-SUBJECT=true" the Request prepared by message functionality technology may contain a parameter 750 and value 760 such as "TD-REQ-SUBJECT=Preamble to the Constitution."

Alternatively, if the data to be processed which relates to the parameter is large, a value of true is assigned to the parameter and the actual data included in data stream 720. For example, referring again to FIG. 8A the command instruction 850 includes the parameter "TD-REQ-BODY" with an associated value of "true." However, since the body 860 of message 800 is rather large Request 700 would include a parameter 750 of "TD-REQ-BODY" and an associated value 760 of "true". The content of body 860 of message 800 is included in data stream 720 of Request 700.

Figure 7B:
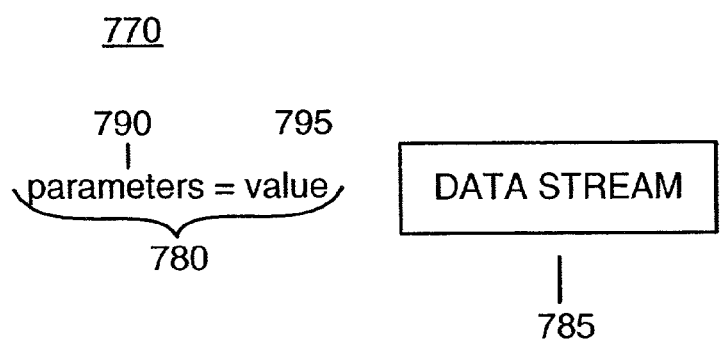
FIG. 7B is an illustration of a Response, according to an embodiment of the present invention.

FIG. 7B illustrates a Response 770 implemented as an HTTP POST Response, which may be returned to message functionality technology 14 by one of the application providers, according to an embodiment of the present invention. Response 770 includes header 780 which has a set of parameters 790 and associated values 795. In an embodiment, there is no host or file in the header information since a communication link has already been established between message functionality technology 14 and the application provider due to the Request delivered by message functionality technology. Also included in Response 770 is data stream 785.

Parameters 790 and associated values 795 provide information to message functionality technology 14 as to what should be done with the information stored as value 795 or included in data stream 785. For example, referring to FIG. 8B, the application provider which performed the translation of body 860 would have provided message functionality technology 14 with a Response which included the parameter "TD-RES-APPEND-BODY". Similar to the above discussion, in an embodiment, the content of the Response, the translated body, is included in the data stream 785 and a value of true is assigned to the parameter. Alternatively, in an embodiment, the content of the response is included as the value.

It will be understood that Response 770 may be in any form which relays the necessary information to message functionality technology 14, and is not limited to HTTP POST format. Additionally, in an embodiment, there are many different parameters and values which maybe included in Response 770 to indicate to message functionality technology 14 how to dispose of the returned data.

For example, a list of parameters which may be included in command Response 770, according to an embodiment of the present invention, are TD-RES-REPLACE-SENDER, TD-RES-ADD-RECIPIENT, TD-RES-REMOVE-RECIPIENT, TD-RES-REPLACE-SUBJECT, TD-RES-APPEND-BODY, TD-RES-REPLACE-BODY, TD-RES-ADD-ATT, TD-RES-REMOVE-ATT, TD-RES-REMOVE-CMD, and TD-RES-SWALLOW-MSG.

It will be understood that the above list of parameters is not intended to be an all inclusive list of possible parameters but merely a list of some of the parameters which may be used in embodiments of the present invention. Additionally, the terms used in the parameters, such as TD, RES, ADD, REPLACE, SWALLOW, APPEND, SENDER, RECIPIENTS, SUBJECT, SUBJECT, BODY, ATT, CMD, and MSG are used only as descriptive examples and other terms, combination of letters, numbers or other characters may be used to indicate parameters as used with embodiments of the present invention.

It will also be understood that any designated value maybe assigned to the parameters and is not limited to a value of true or false. For example, a value of 1 and 0, or any other combination of letters, characters, or other symbols may be used in assigning values to the parameters in accordance with embodiments of the present invention. Additionally, the data associated with the parameter may be assigned as the value.

Including the above parameters with a value in Response 770 will indicate to message functionality technology how the returned information is to be disposed of.

Receiving the parameter TD-RES-REPLACE-SENDER in Response 770, results in the From field being replaced with value 795 returned by the application provider.

Receiving the parameter TD-RES-ADD-RECIPIENT in Response 770, results in message functionality technology modifying the contents of the To field of a message to include the value 795 returned by the application provider.

Receiving the parameter TD-RES-REMOVE-RECIPIENT in Response 770, results in message functionality technology removing an original recipient from the list of recipients of the message.

Receiving the parameter TD-RES-REPLACE-SUBJECT in Response 770 included in a message, results in message functionality technology replacing the subject line of the original message with a value 795 provided by the application provider in Response 770.

If a value 795 of true is included with the parameter TD-RES-APPEND-BODY in Response 770, then the content of data stream 785 provided by the designated application provider will be attached to the end of the body of the original message prior to its delivery to the recipients.

Including the parameter TD-RES-REPLACE-BODY with a value 795 of true in Response 770, results in the body of the original message being replaced with the content of data stream 785 provided by the designated application provider.

If a value 795 of true is assigned to the parameter TD-RES-ADD-ATT in Response 770, the contents of the data stream 785 provided by the application provider will added to the attachments of the original message.

Receiving the parameter TD-RES-REMOVE-ATT with a value 795 of true in Response 770, results in message functionality technology 14 removing the attachments of the original message.

If a value 795 of true is assigned to the parameter TD-RES-REMOVE-CMD is included in Response 770, then command instruction included in the original message will be removed by message functionality technology from the message prior to its delivery to a recipient.

Receiving the parameter TD-RES-SWALLOW-MSG in Response 770 with a value 795 of true, will instruct message functionality technology to not send the message to its originally intended recipients.

Example of Messages Prior to and After Computation

FIG. 8A illustrates a block diagram of a message 800 as prepared and sent by user 11 using the steps illustrated in FIG. 2, according to an embodiment of the present invention. FIG. 8B illustrates a block diagram of a message 890 after computation has been performed, using the method illustrated in FIG. 6, according to an embodiment of the present invention.

FIG. 8A illustrates a message 800 upon which computation is to be performed, according to an embodiment of the present invention. Included in the message 800 is a command instruction implemented as a URL 850, which designates which service is to perform the computation and what information that service needs. In FIG. 8A the URL 850 includes information that the body of the message is to be translated into French using a service and application provider identified as www.service.com/translate (e.g., www.altavista.com/babelfish). In an embodiment, the translated body may be attached to the end of the message, thereby including both the original English version and the translated French version, or the translated version may replace the original body.

From field 810 designates that the message is being sent by a user who has an address of "jdoe@mymail.com". Also included in message 800 is To field 820 indicating that the recipient of the message is to be "kdoe@hismail.com", and Cc field 830 designating that a copy is to be delivered to "bdoe@hermail.com". Also included in message 800 is subject line 840 which includes the English text "Preamble to the Constitution," and body 860 which includes English text of the Preamble to the Constitution.

FIG. 8B illustrates a message 890 which has been modified, using the method illustrated in FIG. 6, according to an embodiment of the present invention. The message 890 is the message 800 modified based on the instructions of URL 850, according to an embodiment of the present invention. Message 890 includes From field 810, To field 820, and Cc field 830, similar to that of message 800 illustrated in FIG. 8A. Also included in message 890 is the original body 860. Additionally, a translated version 870 of body 860 has been included in the message 890 prior to it being delivered.

FIGS. 9A and 9B illustrate block diagrams of a message as sent by user 11 and the message after computation has been performed, according to another embodiment of the present invention.

FIG. 9A illustrates a message 900 on which computation is to be performed, according to an embodiment of the present invention. Included in the message 900 is a command instruction implemented as file 910 which has been attached to message 900. The file 900 includes instructions as to which service is to perform the computation and what information that service needs.

File 910 may be an Internet shortcut file which includes a URL. File 910 stored as an Internet Shortcut file will include the information required by message functionality technology for controlling the requested computation. In FIG. 9A file 910 includes information that the body of the message is to be translated into French using a service and application provider identified as www.service.com/translate.

From field 810 designates that the message is being sent by a user who has an address of "jdoe@mymail.com". Also included in message 900 is To field 820 showing that the recipient of the message is to be "kdoe@hismail.com", and Cc field 830 designating that a copy is to be delivered to "bdoe@hermail.com". Also included in message 900 is subject line 840 which includes the English text "Preamble to the Constitution," and a body 860 which includes English text of the Preamble to the Constitution.

FIG. 9B illustrates message 920 which has been modified according to an embodiment of the present invention. The message 920 is the message 900 modified according to an embodiment of the present invention based on the instructions in file 910.

Message 920 includes From field 810, To field 820, and Cc field 830, similar to that of message 900 illustrated in FIG. 9A. A translated version 970 of body 860 and a translated version 940 of subject line 840 has been included in message 920 by message functionality technology prior to it being delivered to a recipient. In the embodiment illustrated by FIG. 9B the original body 860 has been removed and the file 910 has been removed prior to delivery. In such an embodiment, the receiving party will have no knowledge that the message has been modified after it was sent by user 11.

It should be understood that the particular embodiments described above are only illustrative of the principles of the present invention, and various modifications could be made by those skilled in the art without departing from the scope and spirit of the invention. Thus, the scope of the present invention is limited only by the claims that follow.

What is claimed is:

1. A method for enhancing the functionality of an electronic message, comprising the steps of:

receiving the electronic message by message functionality technology;

determining whether the message includes at least one command instruction by the message functionality technology and delivering the message if the message does not contain a command instruction;

identifying an application provider that will modify the message by the message functionality technology based on the information contained in the command instruction if the message does contain a command instruction;

preparing a request by the message functionality technology based on instructions contained in the command instruction;

transmitting the request to the application provider;

receiving a response from the application provider as a result of the transmission of the request;

determining whether the response includes any instructions by the message functionality technology and delivering the message if it does not contain an instruction;

modifying the original electronic message based on the instructions contained in the response if the response includes instructions; and delivering the modified message to the intended recipients.

2. A method according to claim 1 wherein when the message contains multiple command instructions the determining, identifying, preparing, transmitting, receiving, determining, and modifying steps are repeated for each command instruction in the message prior to the delivery of the message.

3. A method according to claim 1 wherein the command instruction is in the form of a URL.

4. A method according to claim 1 wherein the request is prepared in a format for transmitting using an HTTP POST command.

5. A method according to claim 1 wherein the request includes a destination, a set of parameters with associated values, and a data stream.

6. A method according to claim 1 wherein the response is returned in the form of a HTTP POST response.

7. A method according to claim 1 wherein the response includes at least one parameter and at least one value associated with the parameter, and a data stream.

8. A method according to claim 1 wherein the request includes a host, a file, at least one parameter, at least one value associated with the parameter, and a data stream.

9. A method according to claim 8 wherein the host and file indicate the application provider for providing the function; and wherein the at least one parameter and the at least one associated value indicate information to be delivered to the application provider.

10. A method according to claim 1 wherein the message is received by a first portion of the message technology which is located on the computing device from which the message originates and further wherein the first portion of the message functionality re-routes the message so that the message is delivered to a second computing device which includes a second portion of the message technology which receives the re-routed message and controls any modification of the message.

11. A method according to claim 10 wherein when the message contains multiple command instructions the determining, identifying, preparing, transmitting, receiving, determining, and modifying steps are repeated for each command instruction in the message prior to the delivery of the message.

12. A method according to claim 10 wherein the command instruction is in the form of a URL.

13. A method according to claim 10 wherein the request is prepared in a format for transmitting using an HTTP POST command.

14. A method according to claim 10 wherein the request includes a destination, a set of parameters with associated values, and a data stream.

15. A method according to claim 10 wherein the response is returned in the form of a HTTP POST response.

16. A method according to claim 10 wherein the response includes at least one parameter and at least one value associated with the parameter, and a data stream.

17. A method according to claim 10 wherein the request includes a host, a file, at least one parameter, at least one value associated with the parameter, and a data stream.

18. A method according to claim 17 wherein the host and file indicate the application provider for providing the function; and wherein the at least one parameter and at least one associated value indicate information to be delivered to the application provider.

* * * * *